United States Patent [19]
Lee

[11] Patent Number: 5,909,239
[45] Date of Patent: Jun. 1, 1999

[54] VIDEO TELEPHONE AND METHOD FOR CHANGING COMMUNICATION MODE DURING COMMUNICATION

[75] Inventor: Surg-June Lee, Seoul, Rep. of Korea

[73] Assignee: SamSung Electronics Co., Ltd., Kyungki-do, Rep. of Korea

[21] Appl. No.: 08/889,478

[22] Filed: Jul. 8, 1997

[30] Foreign Application Priority Data

Jul. 8, 1996 [KR] Rep. of Korea ............... 96-27518

[51] Int. Cl.⁶ .................................. H04N 7/14
[52] U.S. Cl. .................... 348/14; 348/15; 379/93.17
[58] Field of Search .............................. 348/14, 15, 16, 348/17, 18; 379/93.09, 93.11, 93.17, 102.01, 102.02

[56] References Cited

U.S. PATENT DOCUMENTS

| | | | |
|---|---|---|---|
| 3,711,648 | 1/1973 | Whitney | 348/16 |
| 3,917,904 | 11/1975 | Macrander et al. | 348/16 |
| 5,610,975 | 3/1997 | Tsuchida | 348/14 |
| 5,619,252 | 4/1997 | Nakano | 348/14 |

FOREIGN PATENT DOCUMENTS 409149186  6/1997  Japan ............... H04N 1/00

*Primary Examiner*—Curtis A. Kuntz
*Assistant Examiner*—Melur Ramakrishnaiah
*Attorney, Agent, or Firm*—Robert E. Bushnell, Esq.

[57] ABSTRACT

A video telephone system has a control unit for performing a control routine in response to a mode control signal, a tone code codec unit for decoding, a tone code signal from a telephone network line to produce the mode control signal and receiving a mode control signal from the control unit to generate a tone code indicative of mode setting and changing, and a switch for connecting a telephone network to either a modem or a telephone set under the control of the control unit. The control unit is also provided to control the entire operation of the video telephone system. The video telephone system is capable of selecting, when there is a video communication request from a video telephone of either a calling or a called party, the other party approves the connection/disconnection of a video communication with the video telephone. The video telephone system is also capable of easily changing communication modes during a communication thereof.

15 Claims, 15 Drawing Sheets

VIDEO TELEPHONE AND METHOD FOR CHANGING COMMUNICATION MODE DURING COMMUNICATION

CLAIM OF PRIORITY

This application makes reference to, incorporates the same herein, and claims all benefits accruing under 35 U.S.C. §119 from an application for *VISUAL TELEPHONE AND METHOD FOR CHANGING COMMUNICATION MODES DURING COMMUNICATION* earlier filed in the Korean Industrial Property Office on the $8^{th}$ day of July 1996 and there duly assigned Ser. No. 27518/1996, a copy of which application is annexed hereto.

BACKGROUND OF THE INVENTION

1. Field of the Invention

The present invention relates in general to a video telephone system, and more particularly to a method and an apparatus for changing communication modes during communication between calling and called video telephone systems.

2. Description of the Related Art

A number of normal telephones may be connected to a single telephone network line which has a specific call number.

Even though several video telephones are connected to such a signal transmission line as a telephone network line, the respective telephones are capable of conducting transmission/reception of audio and video information to/from a counterpart video telephone via the telephone network line if the communication between the calling and called video telephones is carried out by using modulation and demodulation techniques. However, if the communication of information between the two video telephones over the telephone network line is achieved by the normal telephony communication technique, only voice communication is possible but not video communication. This is because the video signal transmitted via the telephone line is a digital signal. In other words, the telephone network line is inappropriate for transmitting the digital signal without its modulation, as is well known. Thus, for simultaneous transmission and reception of the audio and video signals via a telephone network line between a calling video telephone and a called video telephone, each video telephone must include a modem device for modulating and demodulating the audio and video signals.

An earlier method of performing video communication via a telephone network line between calling and called video telephones, each of which having a modem device comprises the steps of: calling the called video telephone via the telephone network line, in response to the key-inputted call number, determining whether or not an acknowledge signal is generated by the called video telephone; if so, performing voice communication with the called telephone; determining whether or not video communication is selected according to a consultation with the called telephone; if so, performing the video communication with the called telephone; determining whether or not there is a communication termination request from either the calling or called telephones; and if so, terminating the video communication of the calling video telephone with the called video telephone.

In the earlier method as stated above, video communication can be performed by simultaneously selecting the video communication mode at both video telephones during voice communication. If one of the video telephones is not set to the video communication mode, the video communication cannot be performed therebetween. Thus, so as to perform the video communication between the video telephones, both of them must be set to the visual communication mode.

Also, it is impossible to change a video communication mode to a voice communication mode during communication, and vice versa.

SUMMARY OF THE INVENTION

It is therefore an object of the present invention to provide a video telephone system and a method for changing a communication mode to other communication modes during a communication thereof.

According to an aspect of the present invention, a video telephone system with functions for switching between video and voice communication modes, comprises: a modem for transmitting and receiving video and voice signals so as to perform a video communication via a telephone network line connected therewith; a control unit for performing a control routine in response to a mode control signal and for enabling the modem to be set to the video communication mode or the voice communication mode; a telephone handset for a voice communication via the telephone network line connected therewith; a switch for connecting the telephone network line to either the modem or the telephone handset under the control of the control unit; and a tone code codec unit connected between the control unit and the telephone network line, for decoding a tone code signal from the telephone network line to produce the mode control signal and for encoding the mode control signal from the control unit to generate a tone code indicative of setting and changing the communication modes during a communication of the video telephone.

In the preferred embodiment, the tone code codec unit comprises a tone code decoder for decoding the tone code signal from the telephone network line and a tone code encoder for encoding the mode control signal from the control unit. The tone code decoder comprises an analog-to-digital converter for converting an analog tone code signal into a digital tone code signal, a decoder for decoding the digital tone code signal to generate the mode control signal, and a memory for storing data associated with the decoding of the tone code signal. The tone code encoder comprises a memory for storing data associated with the encoding of the tone code signal, an encoder for encoding the mode control signal to generate the digital tone code, and a digital-to-analog converter for converting the digital tone code into an analog tone code signal.

According to another aspect of the present invention, a method for changing communication modes during communication between calling and called video telephone systems, comprises the steps of: selecting a communication function in accordance with a function key entry; determining whether the calling video telephone is in a calling state; calling, if in the calling state, the called video telephone so as to connect the calling video telephone with the called video telephone; setting, if not in the calling state, the calling video telephone so as to be in a stand-by state so as to wait for a call; connecting the calling and called video telephones when the call occurs; performing voice or video communication between the calling and called video telephones in accordance with the selected communication function; determining whether a mode changing request has been generated by either the calling or the called video telephone during the communication therebetween; if so, changing a performing communication mode to the other communication mode so as to perform the communication in accordance with the communication changed thus; and if not, terminating the communication between the calling and called video telephones.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
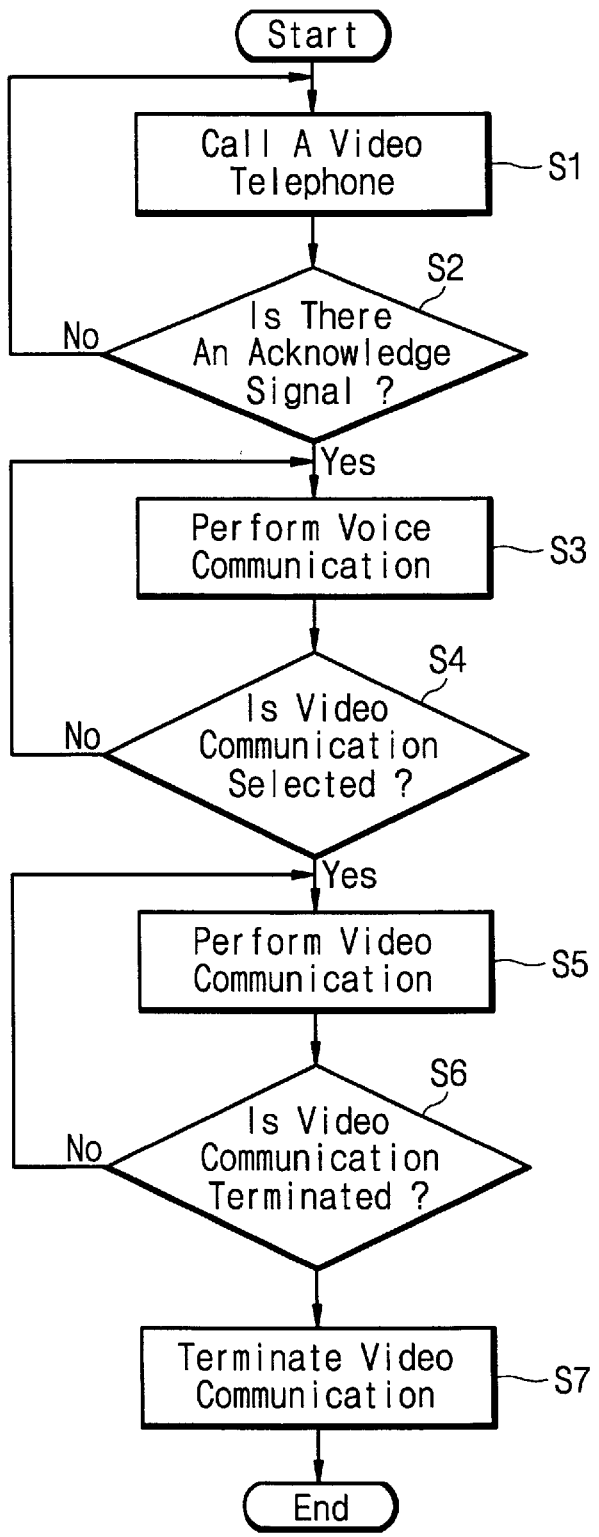
FIG. 1 is a flowchart illustrating an earlier method of performing video communication via a telephone network line between calling and called video telephone systems.

FIG. 1 is a flowchart illustrating the earlier method for performing video communication as noted in the Description of the Related Art above.

As shown in FIG. 1, the earlier method comprises of steps of: calling the called video telephone via the telephone line network in response to the key-inputted call number in step S1; determining whether or not an acknowledge signal has been generated by the called video telephone in step S2; if so, performing voice communication with the called telephone in step S3; determining whether or not video communication has been selected according to a consultation with the called telephone in step S4; if so, performing the video communication with the called telephone in step S5; determining whether or not there is a communication termination request from either the calling or called telephones in step S6; and if so, terminating the video communication of the calling video telephone with the called video telephone in step S7.

Figure 2:
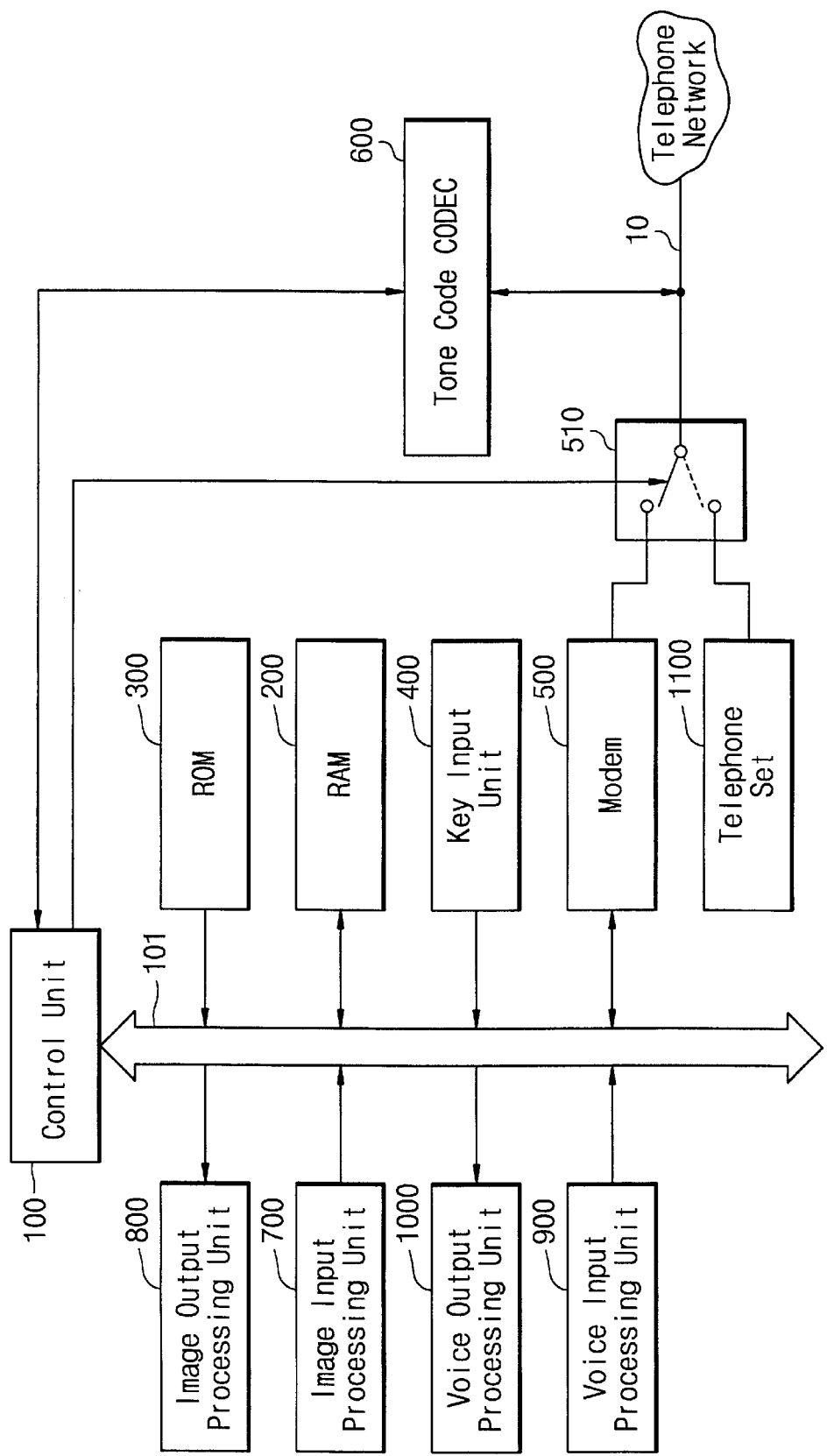
FIG. 2 is a block diagram of a video telephone system according to an embodiment of the present invention.

Referring to FIG. 2, a novel video telephone system in accordance with an embodiment of the present invention includes a control unit 100 for performing a control routine in response to a mode control signal MCS, a tone code CODEC (coder & decoder) unit 600 for generating a tone code indicative of mode setting and for changing in response to the mode control signal MCS from the control unit 100 to transmit it through the telephone network line 10 to a counterpart telephone and decoding a tone code signal supplied from the counterpart telephone through the telephone network line 10 to produce the mode control signal MCS, and a switch 510 for connecting a telephone network to either a modem 500 or a telephone set 1100 under the control of the control unit 100. The control unit 100 is also provided to control the entire operation of the video telephone system. Thus, the video telephone system is capable of selecting, when there is a video communication request from a video telephone of either a calling or a called party and the other party approves of it or not, the connection/disconnection of the video communication with the video telephone. The video telephone system is also capable of easily changing communication modes during a communication. For instance, when the calling and the called parties are in voice communication with each other by means of their video telephones, the voice communication mode can be changed to a video communication mode in accordance with a key entry of either the calling or the called video telephone, or vice versa, during the communication therebetween. Thus, the video telephone of the present invention can switch between voice and video communication during a communication.

Referring again to FIG. 2, the video telephone system further comprises an image output processing unit 800 (i.e., a monitor), an image input processing unit 700 (i.e., a CCD camera), a voice output processing unit 1000 (i.e., a sound card), a voice input processing unit 900 (i.e., a microphone), a key input unit 400 (i.e., a key matrix) and a memory unit. The memory unit comprises a RAM (random access memory) 200 and a ROM (read only memory) 300. The control unit 100 executes control programs stored in the ROM 300 so as to control the entire operation of the video telephone system.

Figure 3:
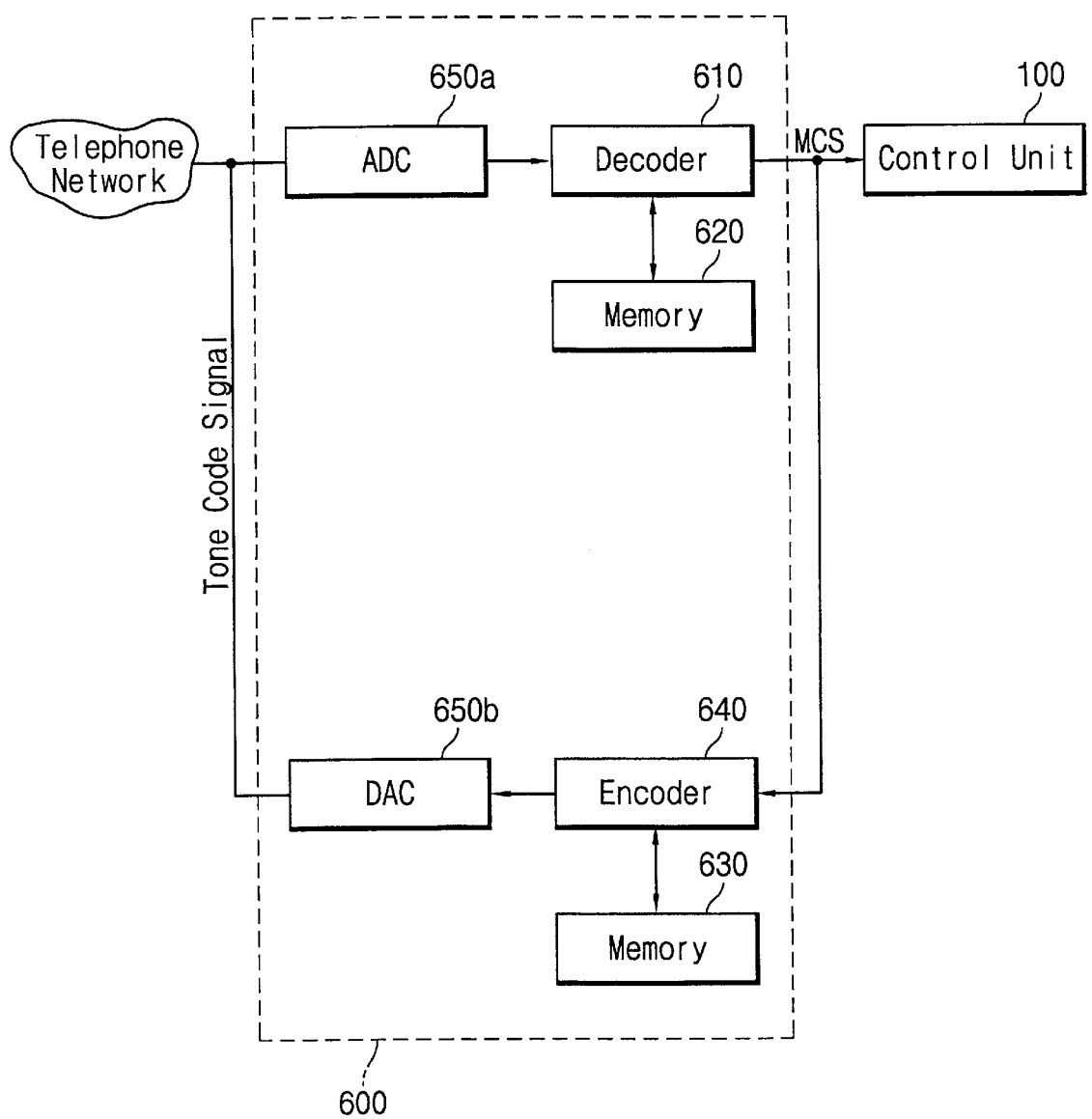
FIG. 3 is a detailed circuit diagram of the tone code coding/decoding unit shown in FIG. 2.

The tone code CODEC unit 600 is connected between the control unit 100 and the telephone network line 10. The CODEC unit 600 decodes a tone code from the telephone network line 10 so as to generate a mode control signal and encodes a tone code so as to generate a tone code signal in response to a mode control signal from control unit 100. The CODEC unit 600 comprises two main sections, a tone code decoder and a tone code encoder. The tone code decoder has, as shown in FIG. 3, an analog-to-digital converter (ADC) 650*a* for converting an analog tone code signal into a digital tone code signal, a decoder 610 for decoding the digital tone code signal to generate a decoded tone code as a mode control signal MCS, and a memory 620 for storing data in relation to the decoding of the tone code. The tone code encoder has, as also shown in FIG. 3, a memory 630 for storing data associated with the encoding of the tone code, an encoder 640 for encoding the mode control signal to generate a digital tone code, and a digital-to-analog converter (DAC) 650*b* for converting the digital tone code into an analog tone code signal.

Figure 6:
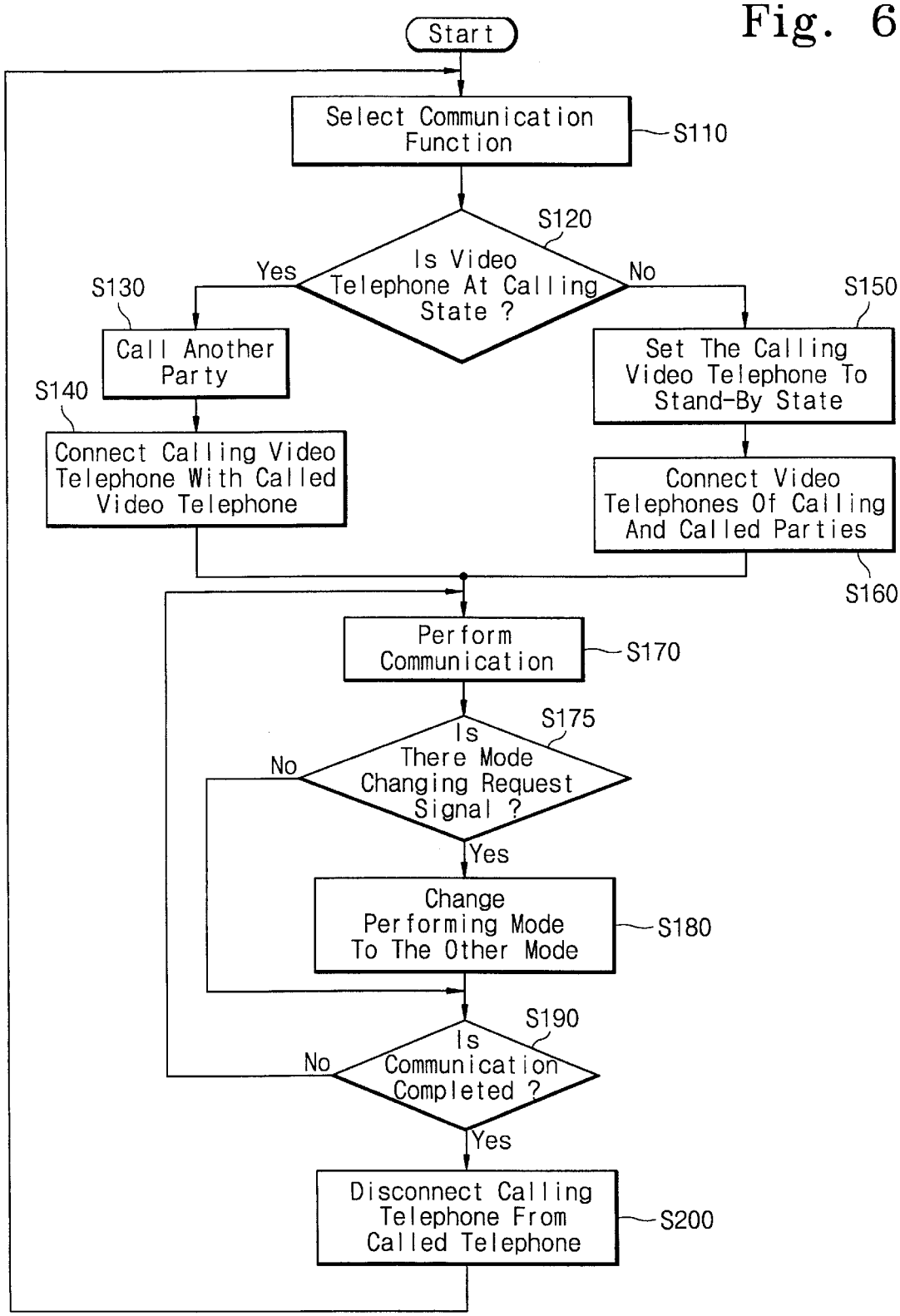
FIG. 6 is a flowchart illustrating a novel method for changing communication modes during communication in accordance with another embodiment of the present invention.

Hereinafter, a method for changing from one communication mode to the other communication mode during a communication between calling and called video telephones will be described with reference FIG. 6. A control program for performing the method which is stored in the ROM 300 of the video telephone system shown in FIG. 2 is executed by means of the control unit 100. The video telephone system of FIG. 2 is capable of changing from one communication mode to the other communication modes during a communication.

First, at step S110, a calling party selects a communication function by means of a key input unit of the video telephone. The communication functions selected includes approving a video communication and selecting a communication mode. The control then proceeds to step S120, wherein it is determined whether the video telephone, i.e. the calling video telephone is in a calling state or a stand-by state; if in the calling state, the control proceeds to step S130. The calling party calls another party, i.e. a called party by dialing, and at step S140 the calling video telephone is connected to the called video telephone.

At step S120, if the calling video telephone is not in the calling state, the control proceeds to step S150. The calling video telephone is then set to the stand-by state so as to wait for a call from another party. The control proceeds to step S160, when a call is generated by another party, the called video telephone is physically connected with the counterpart video telephone.

At step S170, voice or video communication may be performed between the calling and called video telephones; if the calling video telephone is set to a voice communication mode at step S110, then a voice communication is performed. If the calling video telephone is set to a video communication mode, then a video communication is performed.

At step S175, it is determined whether or not there is mode changing request from either the calling or the called video telephone during a communication. If the mode changing request signal is generated, the control proceeds to step S180 wherein a communication mode being performed between the calling and called video telephones is changed to the other communication mode. If a mode changing request signal has not been generated, the control proceeds to step S190 wherein it is determined whether or not the communication has been completed. If the communication has been completed, the control proceeds to step S200 wherein the calling video telephone is disconnected from the called video telephone, and if not, the control proceeds to step S170 so as to continue to perform the communication therebetween.

The mode changing method will be described in greater detail with reference to FIGS. 7A through 9C.

Figure 4:
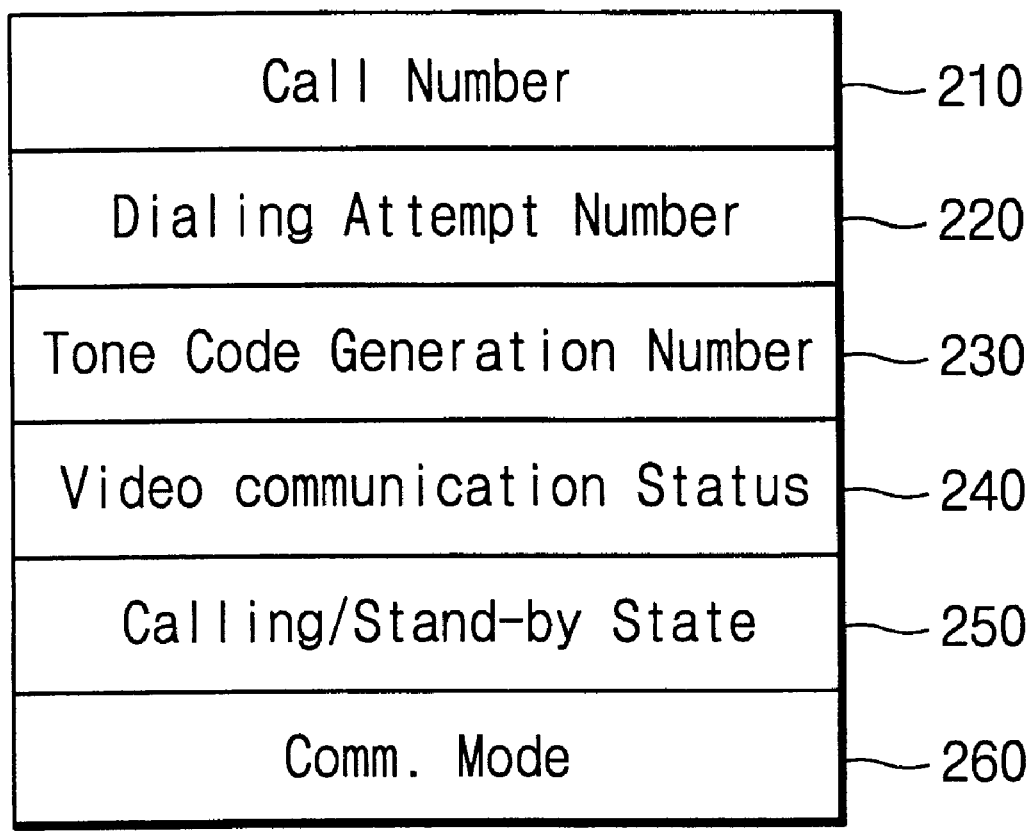
FIG. 4 is a diagram showing a number of buffers which are allotted within the RAM shown in FIG. 2.
Figure 7A:
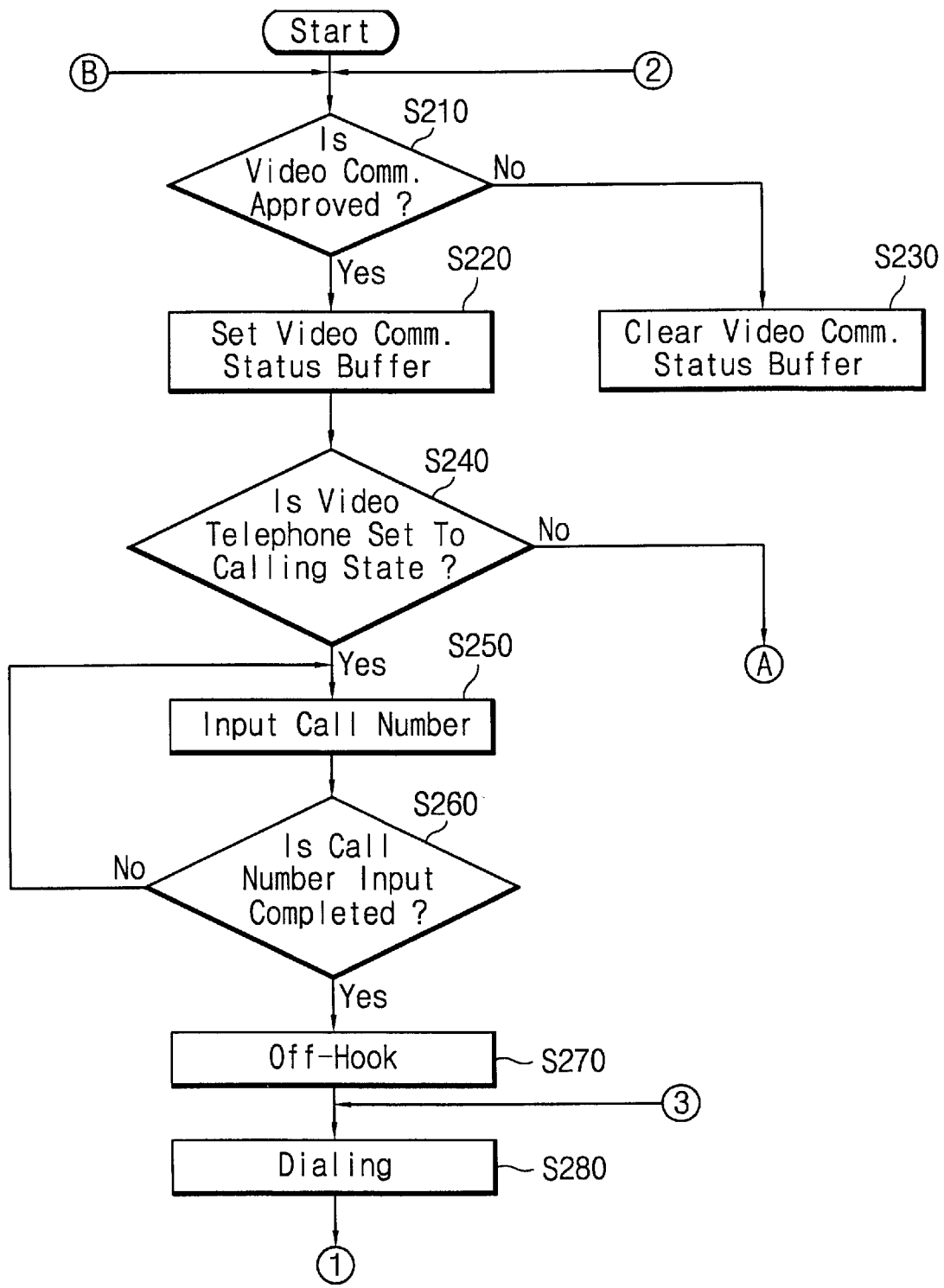
FIG. 7A through FIG. 7C are flowcharts illustrating the detailed method for changing communication modes during communication in the video telephone shown in FIG. 2.

Referring to FIG. 7A, at step S2 10, it is determined whether video communication has been approved. If so, the control proceeds to step S220 wherein the video communication status buffer 240 (refer to FIG. 4) is set to store a video approval signal, i.e. a video flag. If not, the control proceeds to step S230 wherein the buffer 240 is cleared.

Figure 5:
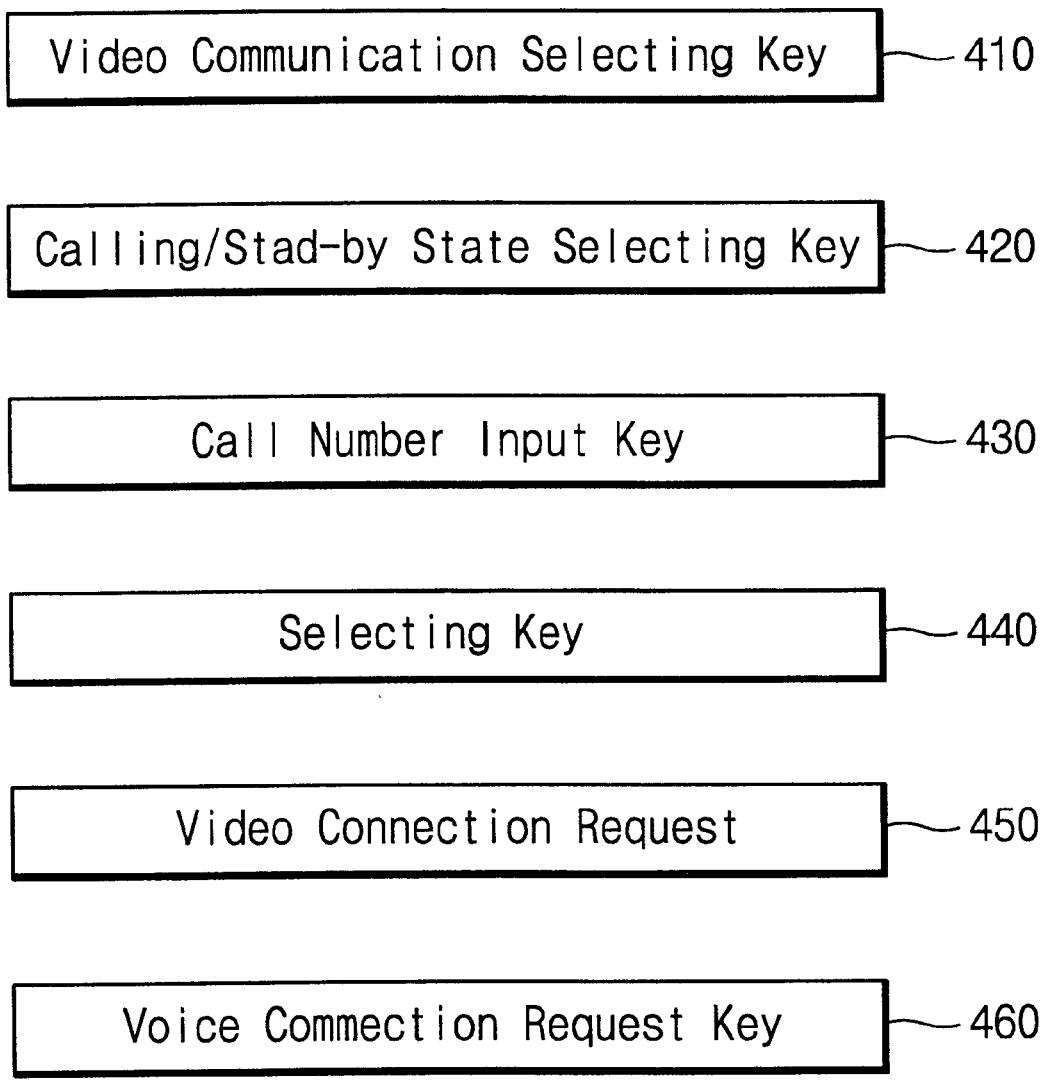
FIG. 5 is a diagram showing a number of keys which are arranged on the key input unit show in FIG. 2.

At step S240, it is determined whether the calling video telephone is set to a calling state or a stand-by state. If in a calling state, the control proceeds to step S250 wherein the video telephone receives a call number through the call number input key 430 (refer to FIG. 5). At step S260, it is checked whether the call number has been completely input. If so, the calling video telephone is placed in an off-hook state (step S270) and then the number is dialed (step S280).

Figure 7B:
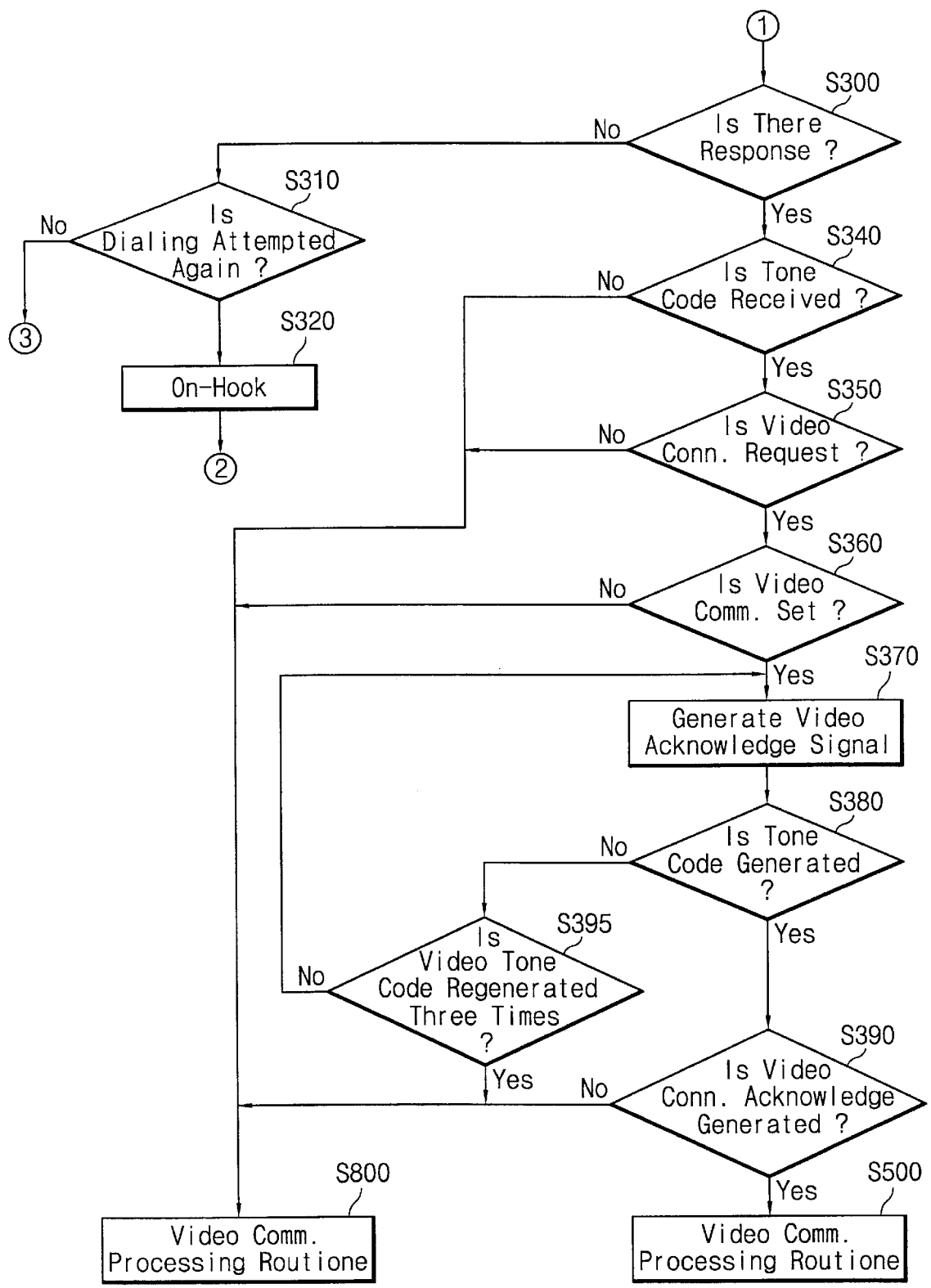

At step S300 of FIG. 7B, it is determined whether there is a response signal from a called video telephone. If not, the control proceeds to step S310 wherein the re-dialing is attempted, for instance, three times. If the re-dialing has been completed by checking the dialing attempt number stored in the buffer 220 (refer to FIG. 4), the control proceeds to step S320 wherein, the calling video telephone is placed in the on-hook state.

If a response signal is received from the called video telephone pursuant to step S300, the control proceeds to step S340 wherein it is determined whether a tone code has been received from the called video telephone. If the tone code has not been received, the control proceeds to step S800 wherein a voice communication processing routine is performed. If the tone code has been received, the control proceeds to step S350 wherein the tone code from the called video telephone is detected as a video connection request signal by means of the control unit 100 of the calling video telephone. Then, it is checked whether the video communication has been set by checking the video communication status buffer 240 pursuant to step S360. If so, the calling video telephone generates a visual acknowledge signal through the tone code codec unit 600 (step S370).

At step S380, it is determined whether a tone code signal has been generated from the called video telephone. If so, the control proceeds to step S390 wherein the tone code is a video connection acknowledge signal, and if not, the control proceeds to step S395 wherein the video acknowledge signal is re-generated, for instance, three times.

At step S390, if the calling video telephone receives the tone code from the called video telephone as the video connection acknowledge signal, the control proceeds to step S500 wherein a video communication processing routine is performed.

On the other hand, at step S350, S360 or S390, if not, the control proceeds to step S800 wherein the voice communication processing routine is performed.

Figure 7C:
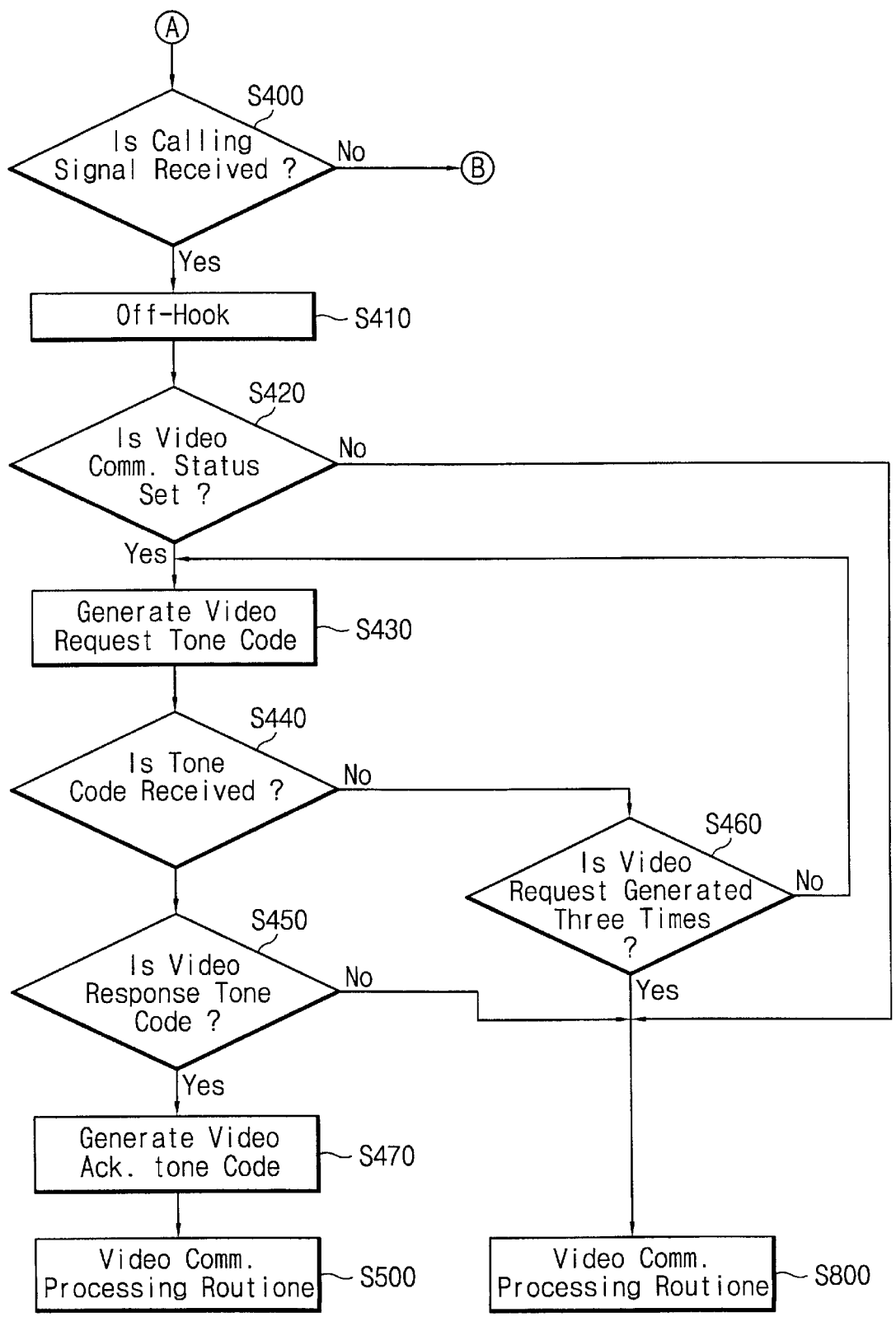

At step S400 of FIG. 7C, the video telephone determines whether a calling signal has been received from another video telephone during the stand-by state thereof. Then, the video telephone which receives the called signal serves as a called video telephone. If a user lifts a handset of the video telephone during receipt of the calling signal, the video telephone is controlled to be in an off-hook state (S410). Then, it is determined at step S420 whether the called video telephone is in a video communication state. If so, the called video telephone generates a video connection request tone code through the tone code codec unit thereof pursuant to step S430 and provides the request tone code to the calling video telephone via the telephone network line, At step S440, the called video telephone checks whether a tone code has been generated by the calling video telephone. If so, it is determined at step S450 whether the tone code from the calling video telephone is a video response tone code. When the video response tone code is received from the calling video telephone, the called video telephone generates a video acknowledge tone code pursuant to step S470 and provides it to the calling video telephone. After this, a video communication processing routine is performed between the calling and called video telephones pursuant to step S500.

On the other hand, at step S440, if a tone code is not generated from the calling video telephone, the control proceeds to step S460 wherein the video connection request signal is regenerated from the called video telephone up to predetermined number of times, e.g. three times. If so, the control proceeds to step S800 wherein a voice communication processing routine is performed.

Hereinafter, the video communication processing routine (S500) will be described in greater detail with reference to FIGS. 8A through 8C.

Figure 8A:
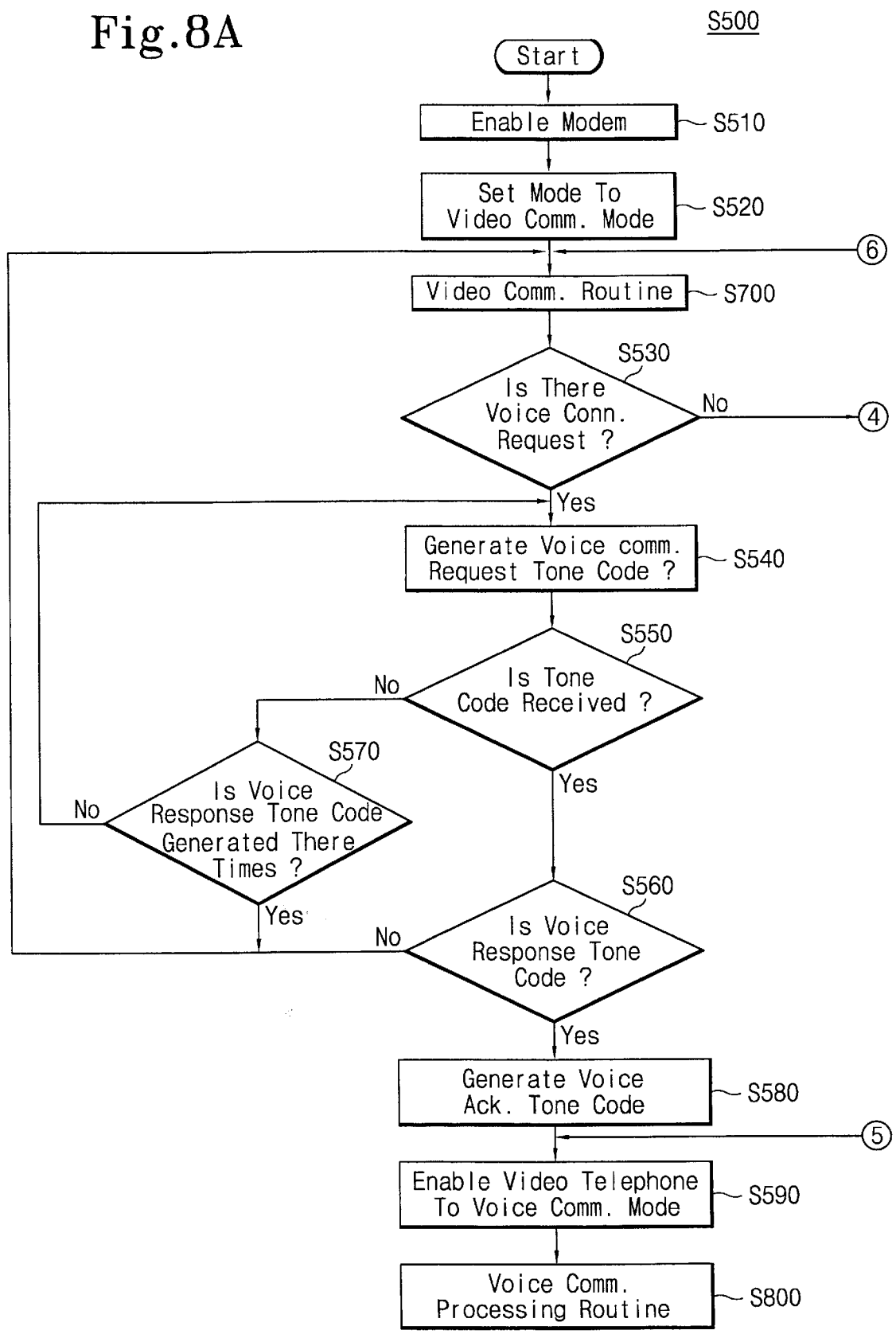
FIGS. 8A through FIG. 8C are flowcharts illustrating the detailed video communication processing routine.

Referring to FIG. 8A, at steps S510 and S520, the modem 500 is enabled in the video communication mode by the control of the control unit 100 and then the video telephone is set to video communication mode. After this, a video communication routine is performed pursuant to step S700.

Figure 8B:
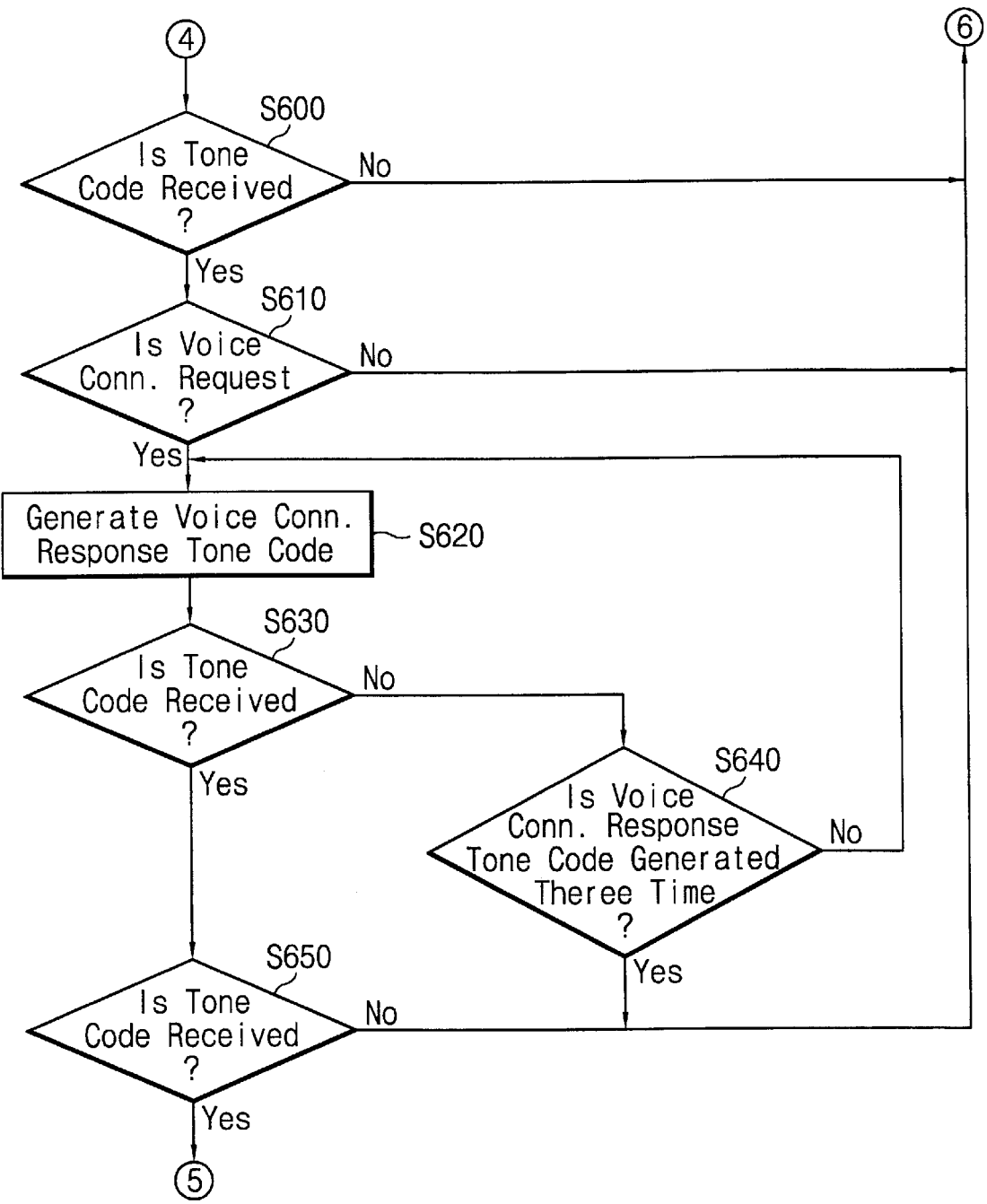
Figure 8C:
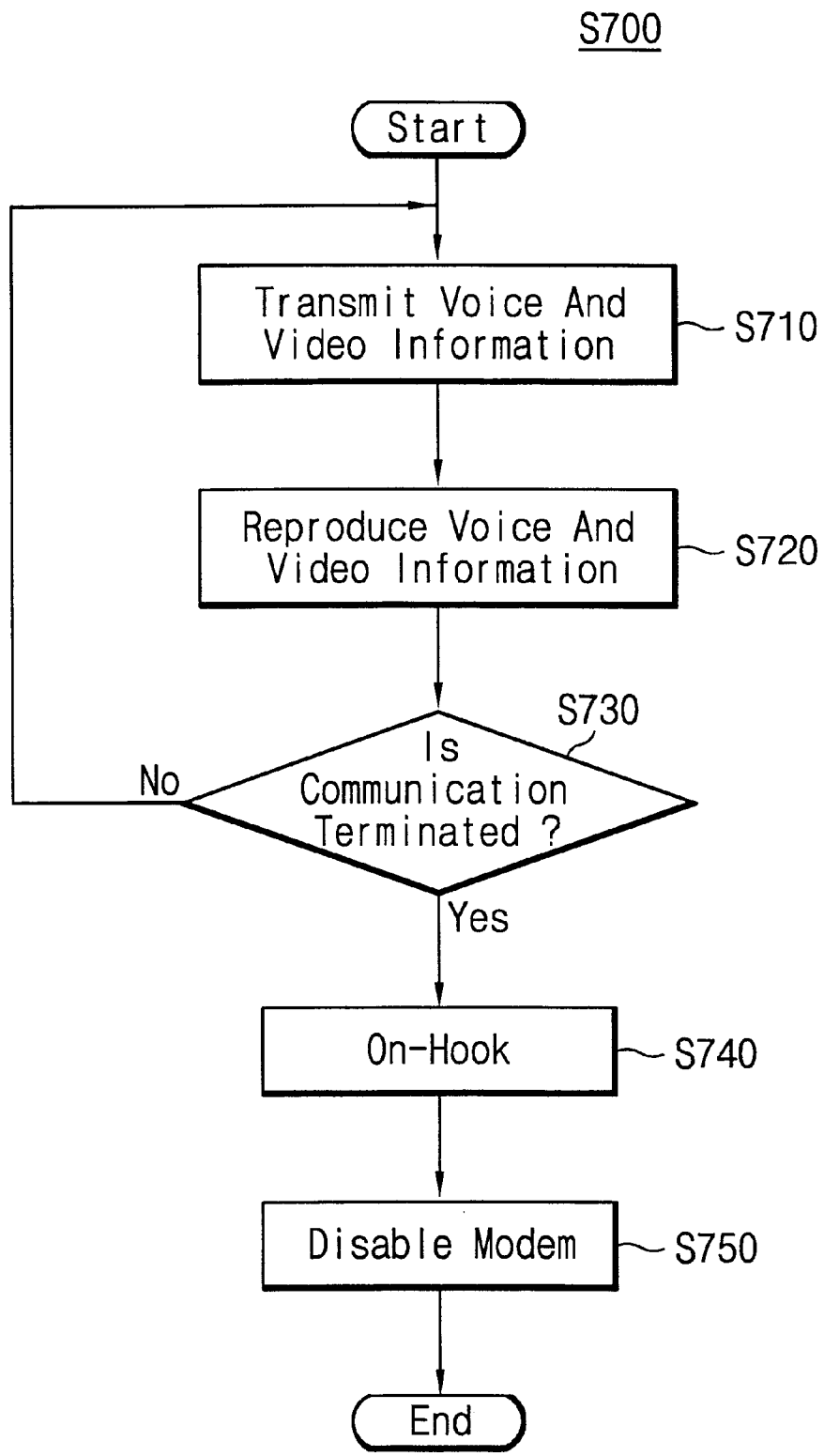

At step S710 of FIG. 8C, voice and video information can be transmitted the telephone network line between the calling and called video telephones. The control proceeds to step S720, at the video telephone side which receives the information reproduces them to image and voice signals and provides the reproduced signals to the image input processing unit 700 as well as the voice output processing unit 1000. If the video communication is terminated at step S730, the control proceeds to step S740 wherein the video telephone is placed in the on-hook state. The modem 500 is disabled so as to be in a non-operation mode in step S750.

On the other hand, when the video communication routine is terminated during step S700, the control proceeds to step S530 wherein it is checked whether there is generated a voice connection request by a user. If so, at step S540 the video telephone generates a voice connection request tone code and provides it to another video telephone through the telephone network line.

At step S550, it is determined whether a tone code has been received from another video telephone. If so, the control proceeds to step S560 wherein it is checked whether the received tone code is identical with a voice connection response tone code, and if not, the control unit proceeds to step S570 wherein it is checked whether a voice connection response tone code is regenerated, for instance, three times.

During step S560, if the received tone code is a voice connection response tone code, the control proceeds to step S580 wherein a voice connection acknowledge tone code is generated. At this time, the modem is placed in the voice communication mode pursuant to step S590, And, the control proceeds to step S800 wherein the voice communication processing routine is performed.

Turning to step S530, if no voice connection request is generated by a user, the control proceeds to step S600 of FIG. 8B wherein it is determined whether a tone code has been received from another video telephone. If so, the control proceeds to step S610 wherein it is checked whether the received tone code is identical with a voice connection request tone code.

At step S620 of FIG. 8B, the video telephone generates a voice connection response tone code and provides it to another video telephone, and the control proceeds to step S630. Herein, it is checked whether a tone code has been received from another video telephone. If so, the control proceeds to step S650 wherein it is checked whether the received tone code is identical with a voice connection acknowledge tone code, and if not, the control unit proceeds to step S640 wherein it is checked whether the voice connection response tone code has been re-generated, for instance, three times.

During step S650, if the received tone code is a voice connection response tone code, the control jumps to step S590 of FIG. 8A so as to place the modem in a voice communication mode. And, during step S640, if the voice connection response tone code is re-generated three times, the control jumps to step S700 of FIG. 8A so as to perform the voice communication routine.

Hereinafter, the voice communication processing routine (S800) will be described in greater detail with reference to FIGS. 9A through 9C.

Figure 9A:
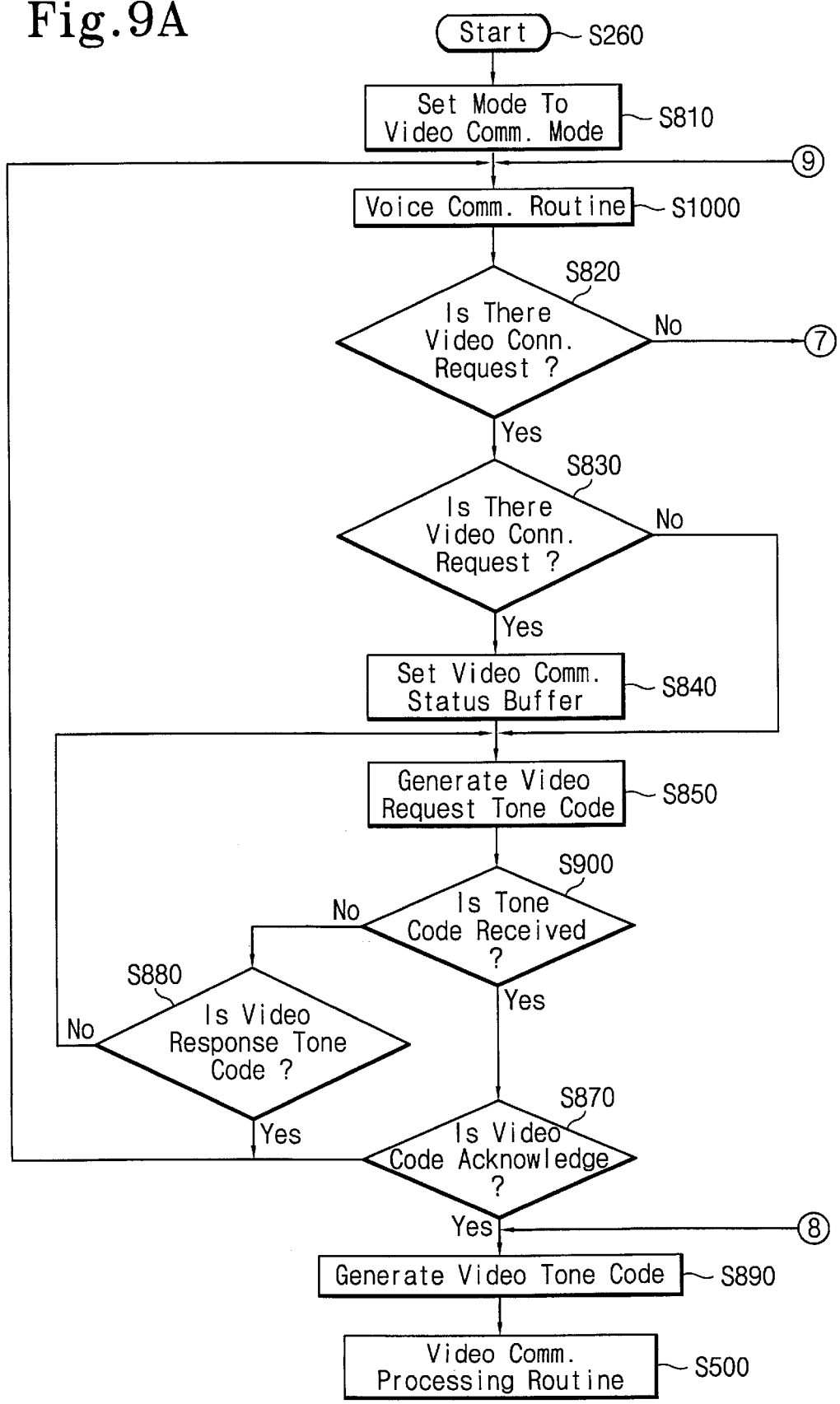
FIG. 9A through FIG. 9C are flowcharts illustrating the detailed voice communication processing routine.

At step S810 of FIG. 9A, the video telephone is set to a voice communication mode. After this a voice communication routine is performed pursuant to step S1000.

Figure 9B:
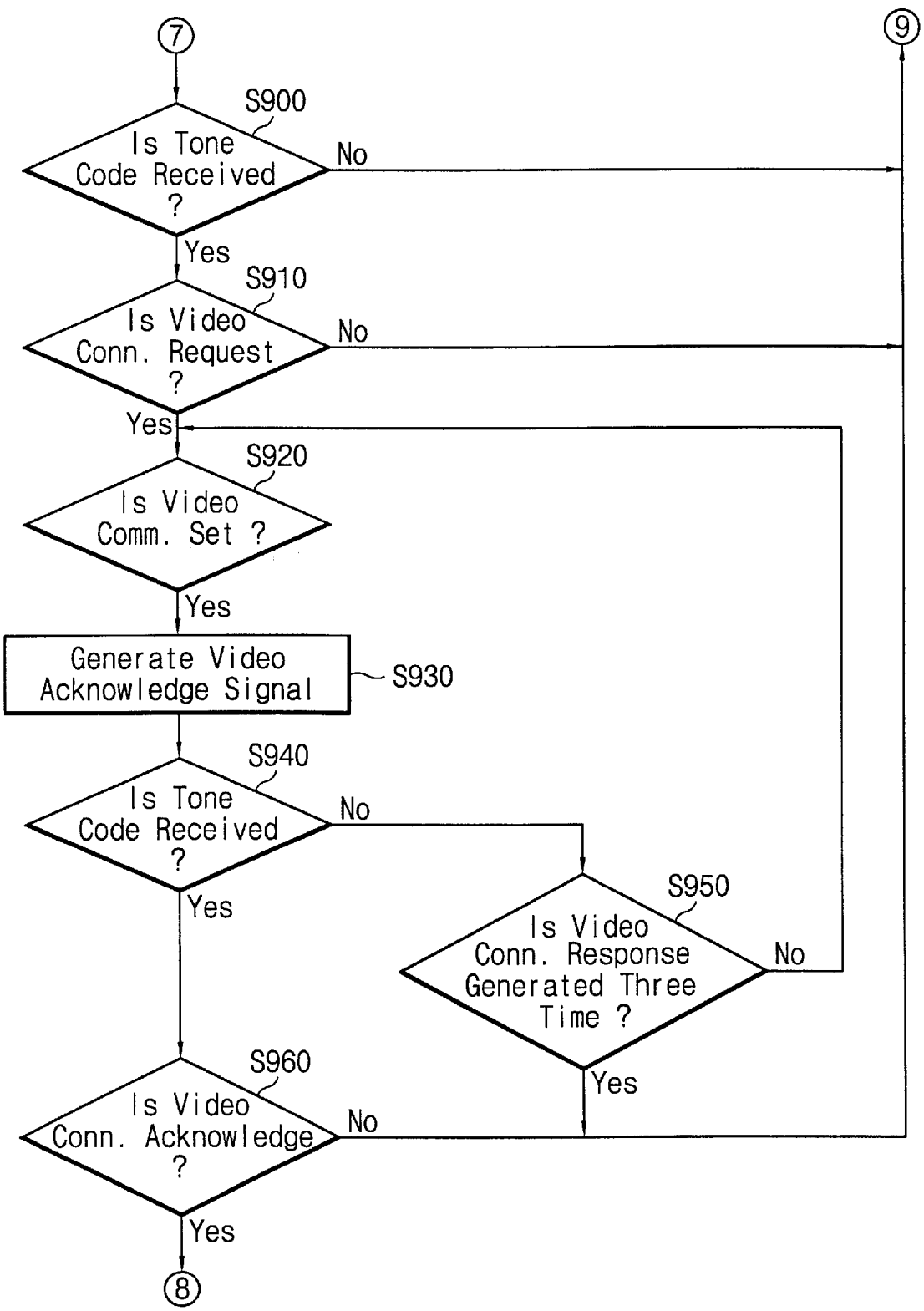
Figure 9C:
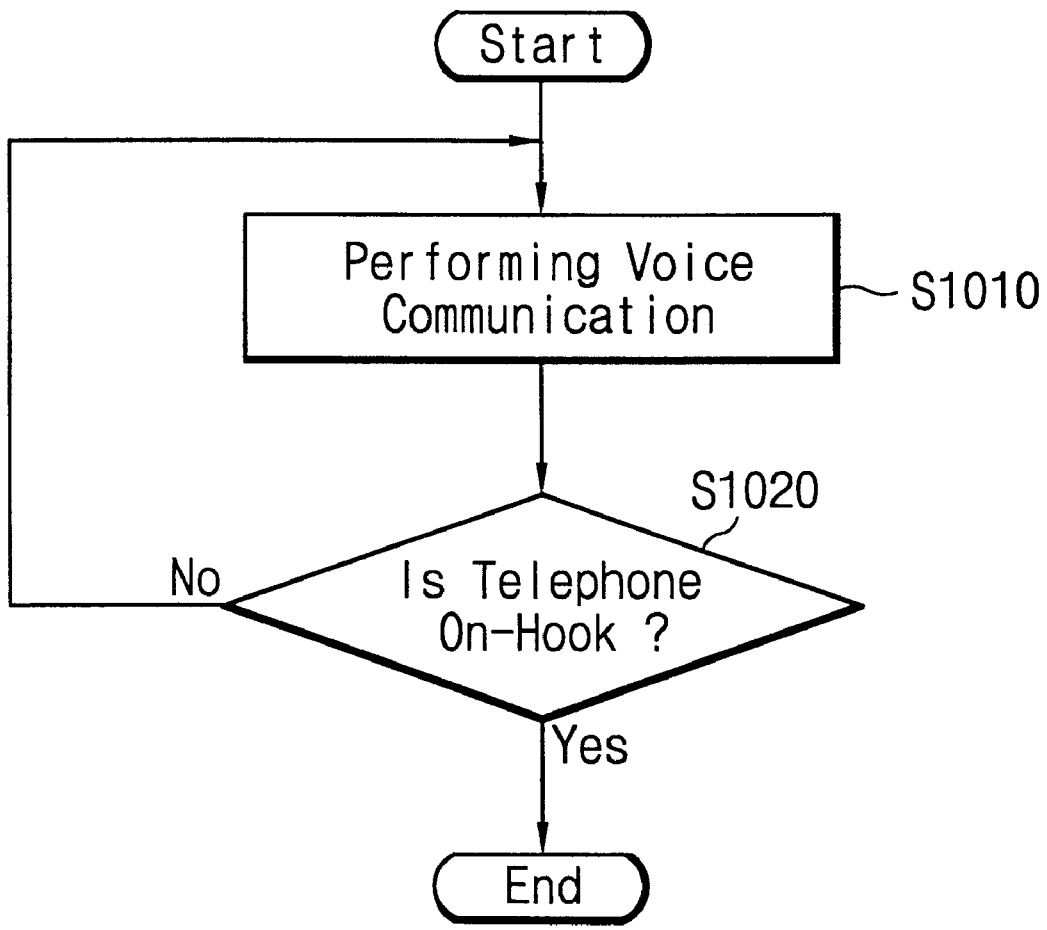

At step S1010 of FIG. 9C, only voice information can be transmitted on the telephone network line between the calling and called video telephones in accordance with the voice communication mode. The control proceeds to step S1020, it is checked whether a hook switch is in an on-hook state. If so, the voice communication routine is terminated, and if not, the control jumps to step S1010 so as to continue to perform the voice communication.

On the other hand, when the voice communication routine is terminated during step S1000, the control proceeds to step S820 wherein it is checked whether a video connection request has been generated by a user. If so, it is checked at step S830 whether the video communication status is set so as to approve video communication. Herein, if the video communication status has not been set, the video telephone sets the status pursuant to S840.

At step S850 of FIG. 9A, the video telephone generates a video connection request tone code and provides it to another video telephone through the telephone network line, and the control proceeds to step S860. Herein, it is determined whether a tone code is received from another video telephone. If so, the control proceeds to step S870 wherein it is checked whether the received tone code is identical with a video connection response tone code, and if not, the control unit proceeds to step S880 wherein it is checked whether a video connection response tone code has been regenerated, for instance, three times.

During step S870, if the received tone code is a video connection response tone code, the control proceeds to step S890 wherein a video connection acknowledge tone code is generated. After this, the video communication processing routine (S500) is performed.

Turning to step S820 of FIG. 9A, if no visual connection request is generated by a user, the control proceeds to step S900 of FIG. 9B wherein it is determined whether a tone code has been received from another video telephone. If so, the control proceeds to step S910 wherein it is checked whether the received tone code is identical with a video connection request tone code. The control proceeds to step S920 wherein it is checked whether the video communication status is set as to approve video communication. Herein, if the video communication status is not set, the control jumps to step S1000 so as to perform the voice communication routine.

At step S930 of FIG. 9B, the video telephone generates a video connection response tone code and provides it to another video telephone, and the control proceeds to step S940. Herein, it is checked whether a tone code has been received from another video telephone. If so, the control proceeds to step S960 wherein it is checked whether the received tone code is identical with a video connection acknowledge tone code, and if not, the control unit proceeds to step S950 wherein it is checked whether the video connection response tone code has been re-generated, for instance, three times.

During step S960, if the received tone code is a video connection response tone code, the control jumps to step S890 of FIG. 8A, and if not, the control jumps to step S1000 so as to perform the voice communication routine.

Also, during step S950, if the video connection response tone code has been re-generated three times, the control jumps to step S1000 of FIG. 8A, and if not, the control jumps to step 930 so as to generate the video connection response tone code.

As described above, according to a video telephone system of the present invention, while a voice communication mode is performed between video telephones of the calling and the called parties, it can be changed to a video communication mode in accordance with a key entry of either the calling or the called video telephone, or vice versa during a communication therebetween. Therefore, the video telephone of the present invention can switch between voice and video communication during a communication thereof.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A video telephone with functions for switching between video and voice communication modes, comprising:

a modem for transmitting and receiving video and voice signals so as to perform a video communication via a telephone network line connected therewith;

a control unit for performing a control routine in response to a mode control signal and enabling the modem to be set to the video communication mode or the voice communication mode;

a telephone handset for a voice communication via the telephone network line connected therewith;

a switch for connecting the telephone network line to either the modem or the telephone handset under the control of the control unit; and a tone code codec unit connected between the control unit and the telephone network line, for decoding a tone code signal from the telephone network line, generated under the manual control of a user from another telephone connected thereto, to produce the mode control signal and for encoding the mode control signal from the control unit, in response to a signal generated under the manual control of a user from the video telephone, to generate a tone code indicative of setting and changing the communication modes during communication of the video telephone.

2. The video telephone of claim 1, said tone code codec unit comprising a tone code decoder for decoding the tone code signal from the telephone network line and a tone code encoder for encoding the mode control signal from the control unit.

3. The video telephone of claim 2, said tone code decoder comprising an analog-to-digital converter for converting an analog tone code signal into a digital tone code signal, a decoder for decoding the digital tone code signal to generate the mode control signal, and a memory for storing data associated with the decoding of the tone code signal.

4. The video telephone of claim 2, said tone code encoder comprising a memory for storing data associated with the encoding of the tone code signal, a plurality of tone codes, an encoder for encoding the mode control signal to generate the digital tone code, and a digital-to-analog converter for converting the digital tone code into an analog tone code signal.

5. The video telephone of claim 1, further comprising special function keys for manually controlling said tone code codec.

6. A method for changing communication modes during communication between calling and called video telephones, said method comprising the steps of;

selecting a communication function in accordance with a function key entry;

determining whether the calling video telephone is in a calling state;

upon determining that the called video telephone is in the calling state, calling the called video telephone so as to connect the calling video telephone with the called video telephone;

alternatively, upon determining that the called video telephone is not in the calling state, setting the calling video telephone so as to be in a stand-by state so as to wait for a call;

connecting the calling and called video telephones to each other when the call occurs;

performing voice or video communication between the calling and called video telephones in accordance with the selected communication function;

determining whether a mode changing request has been generated under the manual control of a user from either the calling or the called video telephone during the communication therebetween;

if so, changing a performing communication mode to the other communication mode so as to perform the communication in accordance with the communication changed thus; and if not, terminating the communication between the calling and called video telephones.

7. The method of claim 6, a video communication processing routine comprising the steps of:

enabling a modem in a video communication mode and setting the video telephone to the video communication mode;

performing a video communication routine;

determining whether a voice connection request has been generated by a user and if so, generating a video telephone voice connection request code and providing it to another video telephone through the telephone network line;

determining whether a tone code has been received from another video telephone and if so, determining whether the received tone code is identical with a voice connection response code and if so generating a voice connection acknowledge tone code and placing the modem in the voice communication mode;

determining whether a tone code has been received from another video telephone and if so determining whether the received tone code is identical with a voice connection request tone code;

if so, generating a voice connection response tone code providing it to another video telephone; and checking whether a tone code has been received from another video telephone and if so determining whether the received tone code is identical with a voice connection acknowledge tone code and if so enabling the video telephone to be in the voice communication mode and effecting a voice communication processing routine.

8. The method of claim 7, the video communication processing routine comprising:

transmitting voice and video information;

reproducing voice and video information;

determining if the communication has been terminated; and if so, placing the video telephone on-hook disabling the modem.

9. The method of claim 6, the video communication processing routine comprising:

performing a voice communication;

determining if the telephone is on-hook; and if so, terminating the routine.

10. The method of claim 6, the video communication processing routine comprising:

setting the mode to a video communication mode and effecting a voice communication routine;

determining if there is a video connection request and if so determining if the video communication status has been set;

if so, setting the video communication status buffer and generating a video request tone code;

determining if the tone code has been received and if so whether there is a video connection acknowledge;

if so, generating a video tone code and effecting a video communication processing routine;

and alternatively, if it has been determined that there is no video connection request after effecting a voice communication routine, determining if a tone code has been received and if so determining if a video connection request has been received and if so determining if a video communication has been set and if so generating a video acknowledge signal; and determining if a tone code has been received and if so determining if a video connection acknowledge has been received and if so generating a video tone code and then effecting a video communication processing routine.

11. A video telephone with functions for switching between video and voice communication modes, comprising:

a modem for transmitting and receiving video and voice signals so as to perform a video communication via a telephone network line connected therewith;

a control unit for performing a control routine in response to a mode control signal and enabling the modem to be set to the video communication mode or the voice communication mode;

a telephone handset for a voice communication via the telephone network line connected therewith;

a switch for connecting the telephone network line to either the modem or the telephone handset under the control of the control unit; and a tone code codec unit connected between the control unit and the telephone network line, for decoding a tone code signal from the telephone network line, generated during a first contact with another telephone connected thereto, to produce the mode control signal and for encoding the mode control signal from the control unit to generate a tone code indicative of setting and changing the communication modes during communication of the video telephone.

12. The video telephone of claim 11, said tone code codec unit comprising a tone code decoder for decoding the tone code signal from the telephone network line and a tone code encoder for encoding the mode control signal from the control unit.

13. The video telephone of claim 12, said tone code decoder comprising an analog-to-digital converter for converting an analog tone code signal into a digital tone code signal, a decoder for decoding the digital tone code signal to generate the mode control signal, and a memory for storing data associated with the decoding of the tone code signal.

14. The video telephone of claim 13, said tone code encoder comprising a memory for storing data associated with the encoding of the tone code signal, a plurality of tone codes, an encoder for encoding the mode control signal to generate the digital tone code, and a digital-to-analog converter for converting the digital tone code into an analog tone code signal.

15. The video telephone of claim 11, further comprising special function keys for manually controlling said tone code codec.

* * * * *